No. 858,391. PATENTED JULY 2, 1907.
C. E. HITE.
PRIMARY BATTERY.
APPLICATION FILED DEC. 23, 1905.
2 SHEETS—SHEET 1.
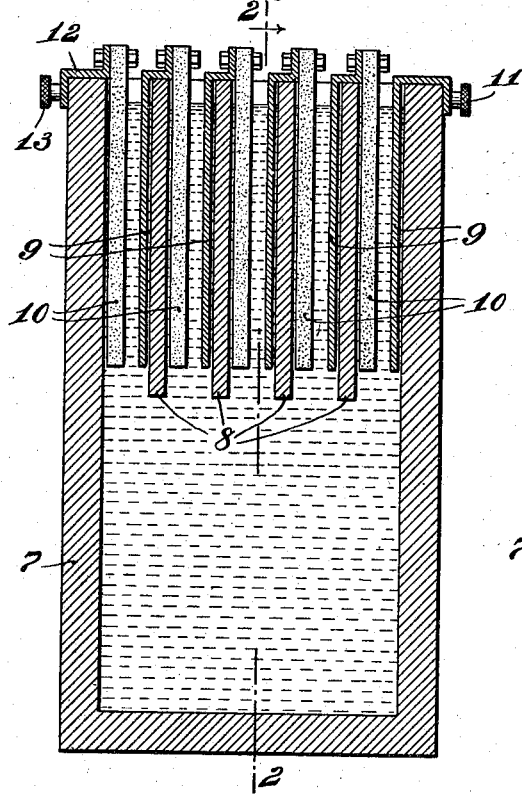
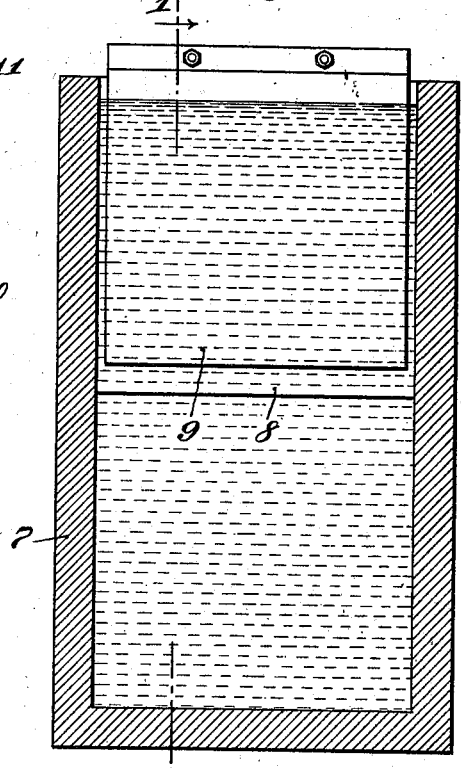
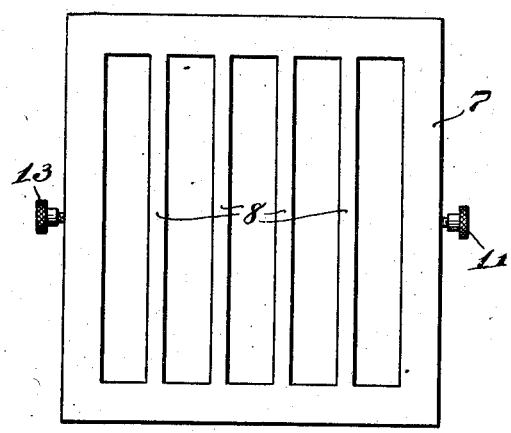
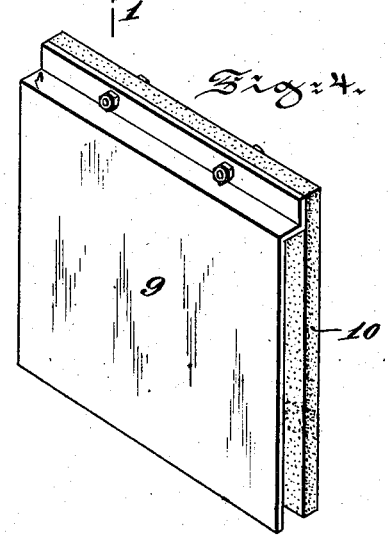
Witnesses:
Jas. C. Wolmsmith
Inventor:
Charles E. Hite
By his Attorneys

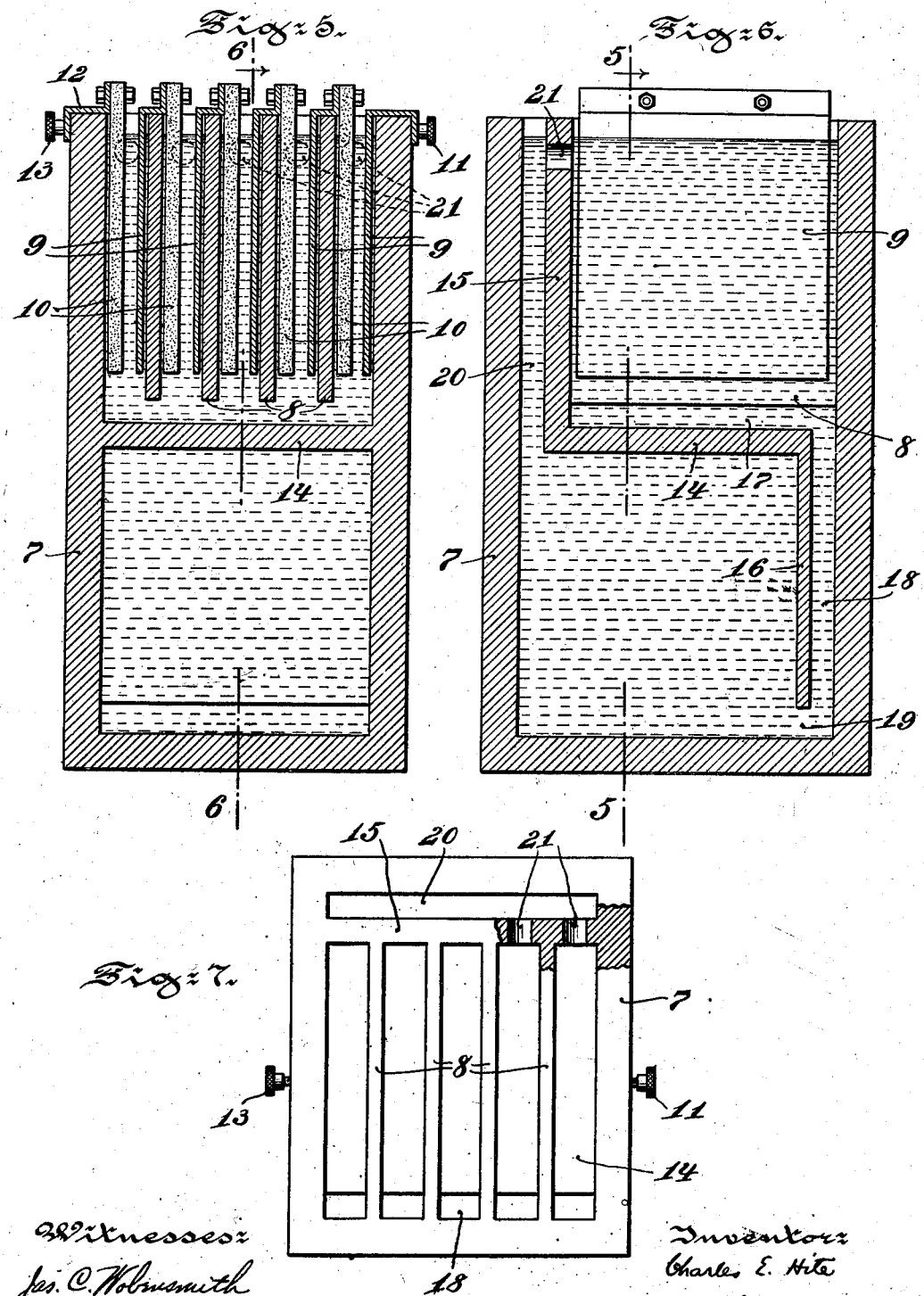

UNITED STATES PATENT OFFICE.

CHARLES E. HITE, OF BURLINGTON, NEW JERSEY, ASSIGNOR TO HITE ELECTRIC COMPANY, A CORPORATION OF DELAWARE.

PRIMARY BATTERY

No. 858,391. Specification of Letters Patent. Patented July 2, 1907.

Application filed December 23, 1905. Serial No. 293,061.

*To all whom it may concern:*

Be it known that I, CHARLES E. HITE, a citizen of the United States, residing at Burlington, in the county of Burlington and State of New Jersey, have invented a new and useful Primary Battery, of which the following is a specification.

My invention relates to improvements in primary batteries.

The object of my invention is to produce a battery or cell of compact form, which will give a greater potential difference between its terminals than is now obtained by two elements of opposite polarity in one liquid.

My invention comprises means for bringing elements of opposite polarity close together, and for maintaining a body of electrolyte in such manner, that, as the electrolyte immediately about the electrodes becomes exhausted, it will be replaced by fresh electrolyte, gradually and continuously, until the entire body of electrolyte becomes exhausted.

My invention also comprises means whereby the exhausted electrolyte is delivered to the bottom of the lower portion of the bulk of stored electrolyte, while fresh electrolyte is delivered to the electrodes from the upper portion of said mass, so that there shall be as little diffusion as possible of the exhausted electrolyte in the fresh.

Referring to the drawings:—Figure 1 is a vertical section on 1, 1 of Fig. 2. Fig. 2 is a vertical section on 2, 2 of Fig. 1. Fig. 3 is a plan view of the cell element, with the electrodes removed. Fig. 4 is a perspective view of a pair of electrodes connected together. Fig. 5 is a vertical section of a modified form of battery on 5, 5 of Fig. 6. Fig. 6 is a vertical section on 6, 6 of Fig. 5. Fig. 7 is a plan view of said modified form of battery with the electrodes removed, and a portion of the wall broken away.

Similar numerals refer to similar parts throughout the several views.

Referring to Figs. 1, 2 and 3, 7 indicates a receptacle or cell made of wood, hard rubber, metal, or any other suitable material properly coated on its inner surface, so as to resist the action of the electrolyte. Such suitable coating may be asphaltum, celluloid, resinous varnishes, or acid proof cements, depending upon the nature of the electrolyte. The upper part of cell or receptacle 7 is provided with a series of vertically extending partitions 8, dividing the said upper part into a series of compartments. The electrodes, such as zinc and carbon, may be in the form shown in Figs. 1 and 4, the zinc 9 being bent over at its upper side, and bolted securely to the carbon 10. The horizontal portion of zinc 9 is adapted to rest upon the top of partition 8, so that the main body of the zinc will lie upon one side of the partition, while the carbon will lie upon the other side of the partition; that is, the zinc will lie in one compartment, while the carbon connected therewith will lie in the next adjoining. The zinc in the compartment on one side of the cell is bent over and connected with the terminal binding post 11, while the carbon in the compartment on the other side of the cell is connected by plate 12 to the other terminal binding post 13. The partitions 8 extend downwardly below the lower extremities of the electrodes, as shown in Fig. 1, so as to separate the electrolyte, in which is immersed each pair of electrodes, from that of each other pair.

The connection and arrangement of electrodes separated by partitions, as shown in the drawings, enables a cell to be constructed whereby any desired number of volts can be produced corresponding to the number of plates or electrodes between the two terminal posts. This gives the same effect in potential as separate cells, but in a much more compact form, and with one electrolyte.

The object of the undivided lower part of the cell 7 is for reservoir or storage capacity for fresh electrolyte. As the electrolyte becomes weaker or exhausted between the electrodes facing each other in each compartment, it becomes heavier with the salt of the metal, and will sink. New or fresh electrolyte will rise from the lower part of the cell to take its place, and there is a continuous but gradual changing of the electrolyte until the entire mass becomes practically exhausted.

In Figs. 5, 6 and 7, I show a modification of the means for circulating the electrolyte to prevent the heavier liquid containing the salt from mixing, by diffusion, directly with the liquid in the lower or storage part of the cell as it settles to the bottom. Slightly below the lower extremity of the partitions 8 I form the horizontal partition 14 extending entirely across the cell in one direction, as shown in Fig. 5, but only part way across the cell in the other direction, as shown in Fig. 6. From one edge of partition 14 I provide the partition 15 extending vertically to the top of the cell 7, and from the other edge of partition 14 I provide the partition 16 extending vertically to near the bottom of cell 7. This leaves the channel 17 beneath the partitions 8 connecting with the vertical channel 18, which delivers through opening 19 beneath partition 16, while channel 20 leads from the upper part of the reservoir upwardly to the series of apertures 21, delivering into each compartment between the partitions 8. By this construction, it will be seen that the heavier or exhausted electrolyte, containing the salt of the metal, will descend to the bottom of the cell through channel 18, while the fresh electrolyte will rise through channel 20, and enter through apertures 21 into the several compartments. Thus will be avoided any unnecessary mixing of the exhausted electrolyte with the fresh electrolyte. This is particularly desirable where the salt of the metal increases the resistance of the electrolyte.

What I claim is:—

1. A primary cell divided at its upper extension into a number of compartments open at the bottom and top, the space beneath said compartments forming a reservoir, and partitions in said receptacle forming a channel from the compartments to the bottom of the reservoir, and a channel from the top of the reservoir to the top of the compartments.

2. A primary cell provided in its upper half with a plurality of vertical extending partitions forming compartments open at the top and bottom, a pair of electrodes in each compartment, the lower half of said receptacle forming a reservoir, an electrolyte common to compartments and reservoir, means for conducting electrolyte from the compartments to the bottom of the reservoir without coming in contact with the mass of electrolyte immediately beneath the compartments, and means for leading the electrolyte so protected from the top of the reservoir to the top of the said compartments.

3. In a primary cell the combination or a receptacle having a plurality of compartments at its upper end, and a reservoir beneath the compartments, the compartments open at the top and bottom, a pair of electrodes in each compartment, an electrolyte common to reservoir and compartments, means for conducting the electrolyte from the compartments, as it becomes partially exhausted, to the bottom of the reservoir without mingling with the fresh electrolyte in the upper part of the reservoir, and means for conducting said fresh electrolyte from the upper part of the reservoir to the upper part of said compartments.

CHARLES E. HITE.

Witnesses:
EUGENE ZIEGLER,
ELIZABETH L. MEGILLIGAN.